US008516583B2

(12) United States Patent
Thomas et al.

(10) Patent No.: US 8,516,583 B2
(45) Date of Patent: Aug. 20, 2013

(54) AGGREGATING THE KNOWLEDGE BASE OF COMPUTER SYSTEMS TO PROACTIVELY PROTECT A COMPUTER FROM MALWARE

(75) Inventors: Anil Francis Thomas, Redmond, WA (US); Michael Kramer, Yonkers, NY (US); Mihai Costea, Redmond, WA (US); Efim Hudis, Bellevue, WA (US); Pradeep Bahl, Redmond, WA (US); Rajesh K Dadhia, Redmond, WA (US); Yigal Edery, Pardesia (IL)

(73) Assignee: Microsoft Corporation, Redmond, WA (US)

( * ) Notice: Subject to any disclaimer, the term of this patent is extended or adjusted under 35 U.S.C. 154(b) by 1812 days.

(21) Appl. No.: 11/096,490

(22) Filed: Mar. 31, 2005

(65) Prior Publication Data

US 2006/0236392 A1    Oct. 19, 2006

(51) Int. Cl.
*G06F 21/00*    (2006.01)
(52) U.S. Cl.
USPC .......................................................... 726/23
(58) Field of Classification Search
USPC ................................................ 713/150; 726/23
See application file for complete search history.

(56) References Cited

U.S. PATENT DOCUMENTS

| | | | |
|---|---|---|---|
| 5,533,123 A | 7/1996 | Force et al. | |
| 5,951,698 A | 9/1999 | Chen | |
| 6,199,204 B1 | 3/2001 | Donohue | |
| 6,208,720 B1 * | 3/2001 | Curtis et al. | 379/114.14 |
| 6,275,942 B1 | 8/2001 | Bernhard et al. | |
| 6,338,141 B1 | 1/2002 | Wells | |
| 6,704,874 B1 | 3/2004 | Porras et al. | |
| 6,775,780 B1 * | 8/2004 | Muttik | 726/24 |
| 7,084,760 B2 | 8/2006 | Himberger et al. | |
| 7,089,428 B2 * | 8/2006 | Farley et al. | 726/22 |
| 7,194,769 B2 * | 3/2007 | Lippmann et al. | 726/25 |

(Continued)

FOREIGN PATENT DOCUMENTS

| | | |
|---|---|---|
| CN | 1543115 A | 11/2004 |
| JP | 11085503 | 3/1999 |

(Continued)

OTHER PUBLICATIONS

Denning, D.E., "An Intrusion-Detection Model," *IEEE Trans. on Software Engineering*, SE-13(2):222-232 (Feb. 1, 1987) IEEE Service Center, Los Alamitos, California.

(Continued)

*Primary Examiner* — Michael S McNally
(74) *Attorney, Agent, or Firm* — Wolfe-SBMC (57) ABSTRACT

In accordance with the present invention, a system, method, and computer-readable medium for aggregating the knowledge base of a plurality of security services or other event collection systems to protect a computer from malware is provided. One aspect of the present invention is a method that proactively protects a computer from malware by using anti-malware services or other event collection systems to observe suspicious events that are potentially indicative of malware; determining if the suspicious events satisfy a predetermined threshold; and if the suspicious events satisfy the predetermined threshold, implementing a restrictive security policy designed to prevent the spread of malware.

20 Claims, 4 Drawing Sheets

(56) References Cited

U.S. PATENT DOCUMENTS

| | | | |
|---|---|---|---|
| 7,254,634 B1 | 8/2007 | Davis et al. | |
| 7,340,777 B1 * | 3/2008 | Szor | 726/26 |
| 7,370,358 B2 * | 5/2008 | Ghanea-Hercock | 726/23 |
| 7,461,404 B2 * | 12/2008 | Dudfield et al. | 726/25 |
| 2001/0039579 A1 | 11/2001 | Trcka et al. | |
| 2002/0040439 A1 | 4/2002 | Kellum | |
| 2002/0184619 A1 | 12/2002 | Meyerson | |
| 2002/0194490 A1 | 12/2002 | Halperin et al. | |
| 2003/0009693 A1 * | 1/2003 | Brock et al. | 713/201 |
| 2003/0070003 A1 | 4/2003 | Chong et al. | |
| 2003/0131256 A1 * | 7/2003 | Ackroyd | 713/201 |
| 2003/0167406 A1 | 9/2003 | Beavers | |
| 2003/0172301 A1 * | 9/2003 | Judge et al. | 713/201 |
| 2004/0230835 A1 | 11/2004 | Goldfeder et al. | |
| 2005/0033989 A1 | 2/2005 | Poletto et al. | |
| 2005/0050378 A1 | 3/2005 | Liang | |
| 2005/0071432 A1 * | 3/2005 | Royston, III | 709/206 |
| 2005/0108578 A1 | 5/2005 | Tajalli | |
| 2005/0198527 A1 | 9/2005 | Johnson et al. | |
| 2005/0204050 A1 | 9/2005 | Turley et al. | |
| 2006/0069909 A1 | 3/2006 | Roth et al. | |
| 2006/0153204 A1 * | 7/2006 | Wang et al. | 370/400 |
| 2006/0259967 A1 * | 11/2006 | Thomas et al. | 726/22 |

FOREIGN PATENT DOCUMENTS

| | | |
|---|---|---|
| JP | 2003233521 | 8/2003 |
| JP | 2005025679 | 1/2005 |
| KR | 20030052511 | 6/2003 |
| WO | WO-2004010269 | 1/2004 |

OTHER PUBLICATIONS

Extended European Search Report mailed Dec. 2, 2009 for EP Publication No. EP 1 708 114.

"Foreign Office Action", Japanese Application No. 2006-073364, (Jul. 22, 2011),15 pages.

"Final Office Action", U.S. Appl. No. 11/129,695, (Jun. 23, 2011),23 pages.

"Foreign Office Action", Korean Application No. 10-2006-0018812, (Aug. 16, 2012), 14 pages.

"Foreign Office Action", Japanese Application No. 2006-073364, (Dec. 2, 2011), 12 pages.

"Final Office Action", U.S. Appl. No. 11/129,695, (Nov. 17, 2009),11 pages.

"Final Office Action", U.S. Appl. No. 11/129,695, (Aug. 2, 2010),13 pages.

"Non-Final Office Action", U.S. Appl. No. 11/129,695, (Jan. 21, 2011),18 pages.

"Non-Final Office Action", U.S. Appl. No. 11/129,695, (Dec. 2, 2008),10 pages.

"Non-Final Office Action", U.S. Appl. No. 11/129,695, (Feb. 24, 2010),13 pages.

"Non-Final Office Action", U.S. Appl. No. 11/129,695, (May 27, 2009),10 pages.

"Reconnex Unveils Network Solution that Protects Corporate Enterprises from Intentional and Accidental Internal Security Threats", *PR Newswire*, (Feb. 24, 2004),4 pages.

"Foreign Office Action", Korean Application No. 10-2006-0018812, (Feb. 28, 2013), 5 pages.

* cited by examiner

AGGREGATING THE KNOWLEDGE BASE OF COMPUTER SYSTEMS TO PROACTIVELY PROTECT A COMPUTER FROM MALWARE

FIELD OF THE INVENTION

The present invention relates to computers and, more particularly, to dynamically protecting a computer from malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, denial of service attacks, theft of information, even misuse/abuse of legitimate computer system features— all of which exploit one or more computer system vulnerabilities for illegitimate purposes. While those skilled in the art will realize that the various computer attacks are technically distinct from one another, for purposes of the present invention and for simplicity in description, all of these attacks will be generally referred to hereafter as computer malware, or more simply, malware.

When a computer system is attacked or "infected" by a computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems.

Figure 1:
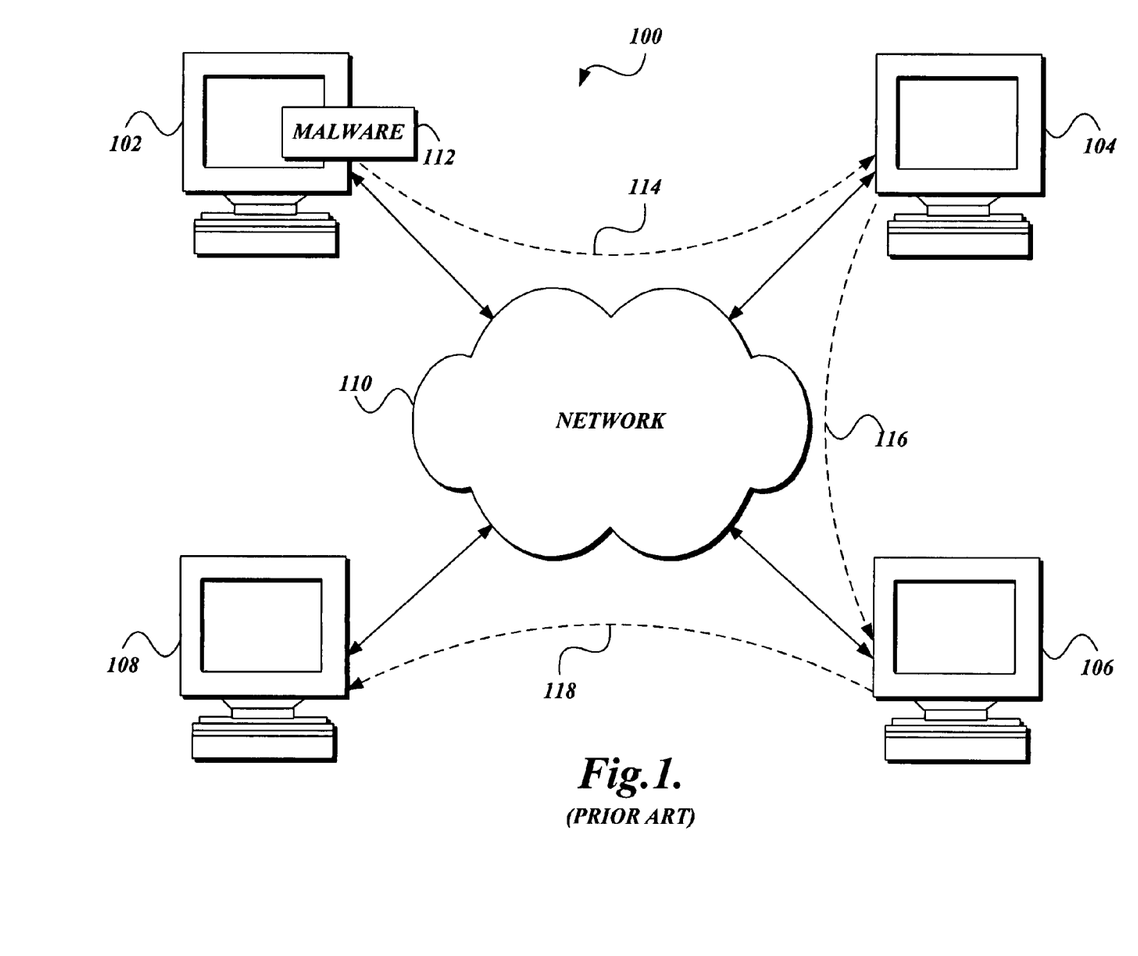
FIG. 1 is a pictorial diagram illustrating a conventional networked environment over which malware is commonly distributed.

FIG. 1 is a pictorial diagram illustrating an exemplary networked environment 100 over which a computer malware is commonly distributed. As shown in FIG. 1, the typical exemplary networked environment 100 includes a plurality of computers 102-108, all interconnected via a communication network 110, such as an intranet, or via a larger communication network, including the global TCP/IP network commonly referred to as the Internet. For whatever reason, a malicious party on a computer connected to the network 110, such as computer 102, develops a computer malware 112 and releases it on the network 110. The released computer malware 112 is received by and infects one or more computers, such as computer 104, as indicated by arrow 114. As is typical with many computer malware, once infected, computer 104 is used to infect other computers, such as computer 106, as indicated by arrow 116, which in turn, infects yet other computers, such as computer 108, as indicated by arrow 118.

As antivirus software has become more sophisticated and efficient at recognizing thousands of known computer malware, so too have the computer malware become more sophisticated. For example, many recent computer malware are now polymorphic or, in other words, they have no identifiable pattern or "signature" by which they can be recognized by antivirus software in transit. These polymorphic malware are frequently unrecognizable by antivirus software because they modify themselves before propagating to another computer system.

As vulnerabilities are identified and addressed in an operating system or other computer system components, such as device drivers and software applications, the operating system provider will typically release a software update to remedy the vulnerability. These updates, frequently referred to as patches, should be installed on a computer system in order to secure the computer system from the identified vulnerabilities. However, these updates are, in essence, code changes to components of the operating system, device drivers, or software applications. As such, they cannot be released as rapidly and freely as antivirus updates from antivirus software providers. Because these updates are code changes, the software updates require substantial in-house testing prior to being released to the public.

Under the present system of identifying malware and addressing vulnerabilities, computers are susceptible to being attacked by malware in certain circumstances. For example, a computer user may not install patches and/or updates to antivirus software. In this instance, malware may propagate on a network between computers that have not been adequately protected against the malware. However, even when a user regularly updates a computer, there is a period of time, referred to hereafter as a vulnerability window, that exists between when a new computer malware is released on the network and when antivirus software on an operating system component may be updated to protect the computer system from the malware. As the name suggests, it is during this vulnerability window that a computer system is vulnerable, or exposed, to the new computer malware.

Figure 2:
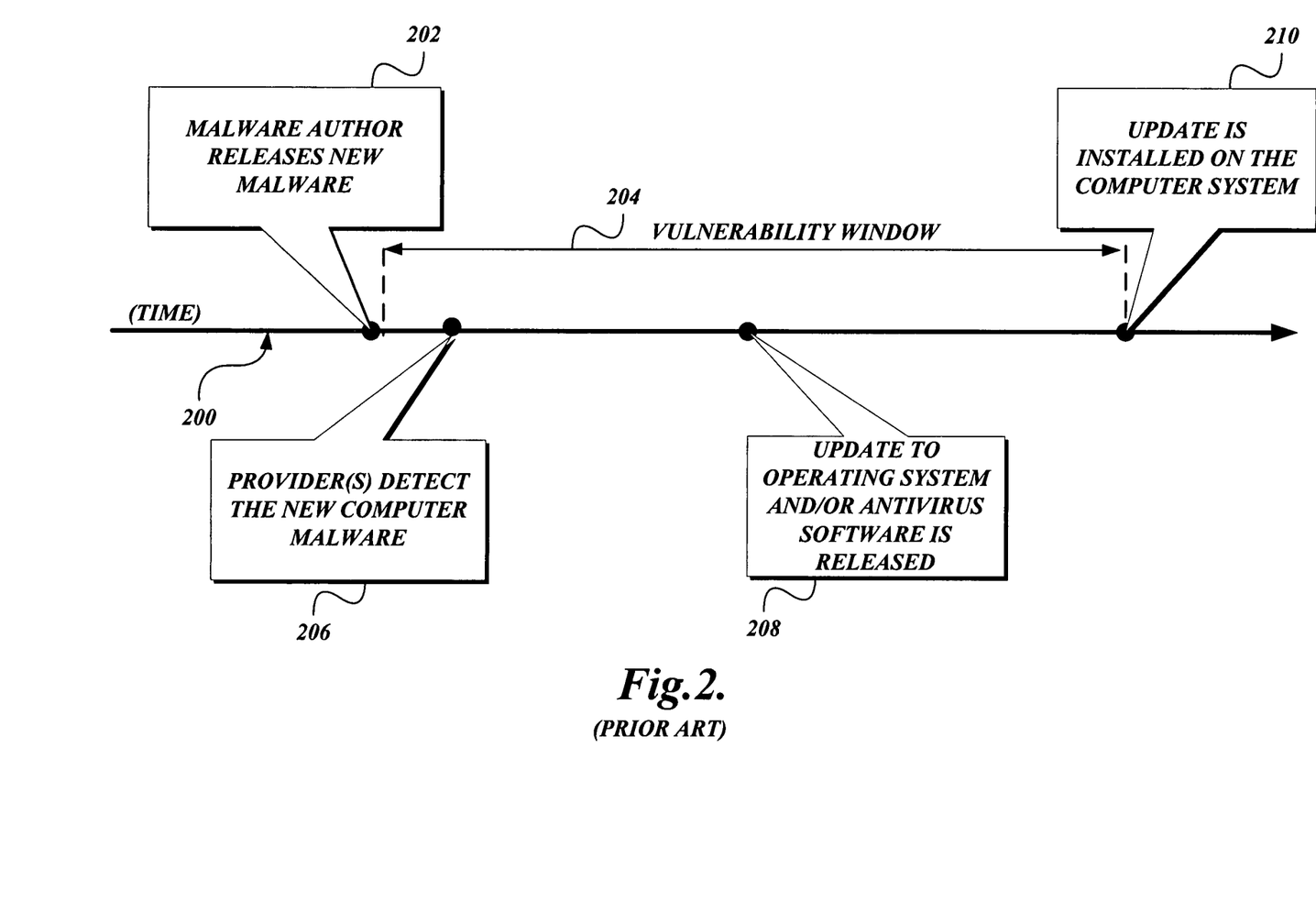
FIG. 2 is a block diagram illustrating an exemplary timeline that demonstrates how a vulnerability window may occur in the prior art.

FIG. 2 is a block diagram of an exemplary timeline that illustrates a vulnerability window. In regard to the following discussion, significant times or events will be identified and referred to as events in regard to a timeline. While most malware released today are based on known vulnerabilities, occasionally, a computer malware is released on the network 110 that takes advantage of a previously unknown vulnerability. FIG. 2 illustrates a vulnerability window 204 with regard to a timeline 200 under this scenario. Thus, as shown on the timeline 200, at event 202, a malware author releases a new computer malware. As this is a new computer malware, there is neither an operating system patch nor an antivirus update available to protect vulnerable computer systems from the malware. Correspondingly, the vulnerability window 204 is opened.

At some point after the new computer malware is circulating on the network 110, the operating system provider and/or the antivirus software provider detect the new computer malware, as indicated by event 206. As those skilled in the art will appreciate, typically, the presence of the new computer malware is detected within a matter of hours by both the operating system provider and the antivirus software provider.

Once the computer malware is detected, the antivirus software provider can begin its process to identify a pattern or "signature" by which the antivirus software may recognize the computer malware. Similarly, the operating system provider begins its process to analyze the computer malware to determine whether the operating system must be patched to protect it from the computer malware. As a result of these parallel efforts, at event 208, the operating system provider and/or the antivirus software provider releases an update, i.e., a software patch to the operating system or antivirus software, which addresses the computer malware. Subsequently, at event 210, the update is installed on a user's computer system, thereby protecting the computer system and bringing the vulnerability window 204 to a close.

As can be seen from the examples described above—which is only representative of all of the possible scenarios in which computer malware pose security threats to a computer system—a vulnerability window 204 exists between the times that a computer malware 112 is released on a network 110 and when a corresponding update is installed on a user's computer system. Sadly, whether the vulnerability window 104 is large or small, an infected computer costs the computer's owner substantial amounts of money to "disinfect" and repair. This cost can be enormous when dealing with large corporations or entities that may have thousands or hundreds of thousands of devices attached to the network 110. Such a cost is further amplified by the possibility that the malware may tamper or destroy user data, all of which may be extremely difficult or impossible to trace and remedy.

To counter the threats presented by malware, an increasing number of anti-malware services and other event detection systems have been developed to monitor entry points and/or data streams for different types of malware. For example, in the context of anti-malware services, many computers now employ firewalls, behavior blockers, and anti-spyware systems to protect a computer in addition to traditional antivirus software. Those skilled in the art and others will recognize that anti-malware services are typically capable of identifying (1) code and/or activities that are known to be characteristic of malware, and (2) code and/or activities that are "suspicious" or potentially characteristic of malware. When code and/or activities that are known to be characteristic of malware are identified, a malware handling routine will be used to "disinfect" or remove the malware from the computer. However, in instances when code and/or activities are identified that are suspicious, the anti-malware services may not have enough information to declare, with sufficient accuracy, that the code and/or activities are actually characteristic of malware. Moreover, other event detection systems have been developed to monitor entry points, data streams, computer attributes and/or activities, for a variety of number of different purposes. For example, some operating systems track the amount of processing performed by a Central Processing Unit ("CPU"), as well as certain significant "events" related to a computer that may be useful when proactively protecting a computer from malware.

SUMMARY OF THE INVENTION

The foregoing problems with the state of the prior art are overcome by the principles of the present invention, which are directed toward a system, method, and computer-readable medium for aggregating the knowledge base of a plurality of anti-malware services and other event detection systems to proactively protect a computer from malware.

One aspect of the present invention is a method for protecting a stand-alone computer that maintains a plurality of anti-malware services and/or event detection systems from malware. More specifically, the method comprises (1) using the anti-malware services and/or event detection systems to observe suspicious events that are potentially indicative of malware; (2) determining if the suspicious events satisfy a predetermined threshold; and (3) if the suspicious events satisfy the predetermined threshold, implementing a restrictive security policy on the computer. In some instances, a security policy may be invoked that takes general security measures, such as blocking most, if not all, incoming and outgoing network traffic. In other instances, the restrictive security policy may limit the resources available to an entity, so that a computer may not be reinfected with malware.

Another aspect of the present invention is a software system that aggregates the knowledge base of a plurality of anti-malware services and/or event detection systems to protect a computer from malware. In one embodiment of the present invention, the software system includes a data collector component, a data analyzer module, and a policy implementer. The data collector component is operative to collect data from different anti-malware systems and/or event detection systems installed on a computer. In this embodiment, the data collected describes suspicious events that are potentially indicative of malware. At various times, the data analyzer module may make a determination regarding whether data collected by the data collector component, taken as a whole, is indicative of malware. If the data analyzer module determines malware exists with sufficient certainty, the policy implementer may impose a restrictive security policy that restricts access to resources of the computer.

In still in other embodiment, a computer-readable medium is provided with contents, i.e., a program that causes a computer to operate in accordance with the method described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with the present invention, a system, method, and computer-readable medium for aggregating the knowledge base of a plurality of security services and/or other event detection systems to protect a computer from malware is provided. Although the present invention will primarily be described in the context of protecting a computer from malware using different anti-malware services, those skilled in the relevant art and others will appreciate that the present invention is also applicable to other software systems than those described. For example, aspects of the present invention may be configured to use any one of event detection systems that are currently available or yet to be developed. The following description first provides an overview of aspects of a software system in which the present invention may be implemented. Then, a method that implements the present invention is described. The illustrative examples provided herein are not intended to be exhaustive or to limit the invention to the precise forms disclosed. Similarly, any steps described herein may be interchangeable with other steps or combinations of steps in order to achieve the same result.

Now with reference to FIG. 3, components of a computer 300 that is capable of implementing aspects of the present invention will be described. The computer 300 may be any one of a variety of devices including, but not limited to, personal computing devices, server-based computing devices, personal digital assistants, cellular telephones, other electronic devices having some type of memory, and the like. For ease of illustration and because it is not important for an understanding of the present invention, FIG. 3 does not show the typical components of many computers, such as a CPU, keyboard, a mouse, a printer, or other I/O devices, a display, etc. However, the computer 300 depicted in FIG. 3 does include antivirus software 302, a firewall application 304, a behavior blocker 306, anti-spyware software 308, and a metrics system 309. Also, the computer 300 implements aspects of the present invention in an aggregation routine 310 that includes a data collector component 312, a data analyzer module 314, and a policy implementer 316. The aggregation routine 310 may be implemented, for example, by a computer-readable medium bearing computer-executable instructions.

Those skilled in the art and others will recognize that an increasing number of anti-malware security services are being made available to protect against all different types of malware at various entry points or data streams on a computer. For example, one defense that is common today for protecting a computer against malware is antivirus software 302. Generally described, traditional antivirus software 302 searches data being accessed from an input/output ("I/O") device, such as a disk, for a "signature" that is characteristic of malware. Also, increasingly antivirus software 202 is performing heuristic malware detection techniques designed to measure activities that are characteristic of malware.

Another defense that is common today in protecting against computer malware is a firewall application 304. Those skilled in the art will recognize that the firewall application 304 is an anti-malware system that protects an internal network from unauthorized access originating from external networks by controlling the flow of information between the internal network and the external networks. All communication originating outside of the internal network is sent through the firewall application 304, which examines the communication and determines whether it is safe or permissible to accept the communication.

Another anti-malware service that is currently available is a behavior blocker 306, which implements policies designed to allow benign activities to occur while interceding when activities that are contrary to policy are scheduled. Typically, a behavior blocker 306 implements a "sandbox" in which code that is potentially infected with malware is analyzed to determine whether the code performs an unacceptable behavior. For example, an unacceptable behavior may take the form of generating a mass e-mailing that will be distributed to entities found in a users' address book. Similarly, unacceptable behavior may be defined as making changes to multiple entries in important databases, like a system registry. In any event, the behavior blocker 306 analyzes programs and implements policies designed to prevent unacceptable behaviors.

Increasingly, other types of anti-malware services are being developed to identify and "disinfect" different types of malware from a computer. For example, the anti-spyware software 308 is designed to identify programs that track actions performed by a user. While spyware may not cause damage to the computer 300, as occurs with other types of malware, some users find it invasive to have their actions tracked and reported to an unknown entity. In this instance, a user may install the anti-spyware software 308 that identifies and disinfects this type of malware from a computer.

Those skilled in the art and others will recognize that certain event detection systems may monitor computer entry points, data streams, and/or computer events and activities. Typically, event detection systems will not only provide logic for identifying events that occur on a computer but also maintain databases, event logs, and additional types of resources for obtaining data about the events observed. For example, as illustrated in FIG. 3, the computer 300 maintains a metrics system 309 designed to observe and record various performance metrics of the computer 300. In this regard, the metric system 309 may monitor CPU usage, the occurrence of page faults, termination of processes, and other performance characteristics of the computer 300. As described in further detail below, patterns in the performance characteristics of the computer 300, and other events that occur, on the computer may be indicative of a malware. While a specific event detection system (e.g. the metric system 309) has been illustrated in described, those skilled in the art and others will recognize that other types of event detection systems may be included in the computer 300 without departing from the scope the present invention.

Those skilled in the art and others will recognize that the anti-malware systems 302, 304, 306, 308, and the event detection system 309 described above with reference to FIG. 3 should be construed as exemplary and not limiting of the present invention. For example, the present invention may be implemented with so-called intrusion detection systems that attempt to detect unauthorized access to the computer 300 by reviewing logs or other information available from a network without departing from the scope of the present invention. Instead, aspects of the present invention may be implemented using different anti-malware systems and other event detection systems than those illustrated and described. Also, aspects of the present invention may be implemented in conjunction with any number of anti-malware services and event detection systems. For example, the anti-spyware software 308 is represented with dashed lines to indicate that the present invention may be used if the computer 300 only included the antivirus software 302, the firewall application 304, the behavior blocker 306, and the metric system 309—and not the anti-spyware software 308. Thus, additional or fewer anti-malware services and event detection systems may be added or removed from the computer 300 in other embodiments of the present invention.

While the accuracy of anti-malware services in detecting increasingly sophisticated malware has improved, existing anti-malware services are limited to detecting malware in specific domains. As a result, these stand-alone, anti-malware services have inherent limitations. For example, the firewall application 304 detects malware by monitoring incoming and outgoing network activity and is limited by the manner in which data is transmitted over a network. Those skilled in the art and others will recognize that a client-based computer typically requests one or more files when obtaining data from a server-based computer. In this instance, components of modern networks segment the file into smaller units ("packets") in order to transmit the packets over a limited bandwidth network connection. The packets are transmitted over the network and are individually scanned by the firewall application 304 for malware when they arrive on the client-based computer. Thus, the firewall application 304 may not have a complete file when scanning packets for malware, and, as a result, may not be able to positively detect malware in all instances.

Even though the firewall application 304 may not be able to positively detect malware in all instances, the firewall application 304 may collect, or be easily configured to collect, data that is a strong heuristic indicator of a malware infection. For example, firewall applications typically monitor network activity, which may include "deep" monitoring of the contents of the packets for suspicious data that may be characteristic of malware. In addition, many firewall applications maintain statistics regarding the volume of network activity that is occurring on a computer. A strong heuristic indicator that a malware is attempting to infect a computer, which may be derived from statistics maintained by the firewall application 304, exists when a significant increase in network activity is detected. By itself, an increase in network activity is not necessarily indicative of malware. Instead, there are legitimate reasons why a computer may be transmitting or receiving an increased volume of data (e.g., a user began downloading large multimedia files over the network). If this type of event was used by the firewall application 304 to positively identify a malware infection, a high number of "false positives" or instances when a malware was incorrectly identified would occur.

Other anti-malware services and event detection systems also observe heuristic indicators that a computer is either infected with malware or a malware is attempting to infect the computer. For example, a specific type of malware known as spyware needs to be active on a computer at all times to track the actions of a user. To be activated at computer start up, spyware will register with one or more "extensibility points" of an operating system such as a Service Control Manager ("SCM") or registry key. Similar to the example provided above, registering a program at an extensibility point of an operating system is not itself a positive indicator that the program is malware. However, registering with an extensibility point is a "suspicious" event that may be indicative of malware. The present invention is directed at collecting and leveraging the knowledge provided by these types of suspicious events to provide proactive protection from malware.

As mentioned above, the computer 300 maintains an aggregation routine 310 that includes a data collector component 312, a data analyzer module 314, and a policy implementer 316. In general terms describing one embodiment of the present invention, the data collector component 312 obtains data from anti-malware services and event detection systems installed on the computer 300 (e.g. the antivirus software 302, the firewall application 304, the behavior blocker 306, the anti-spyware software 308, and the metric system 309) regarding "suspicious" events. As described in more detail below with reference to FIG. 4, the data collected may be merely an indicator from an anti-malware service or event detection system that a suspicious event occurred. Also, the data collector component 312 may obtain metadata from an anti-malware service or event detection system that describes attributes of a suspicious event. In either instance, the data collector component 312 serves as an interface to anti-malware services and event detection systems installed on the computer 300 for reporting and/or obtaining data regarding suspicious events.

Figure 3:
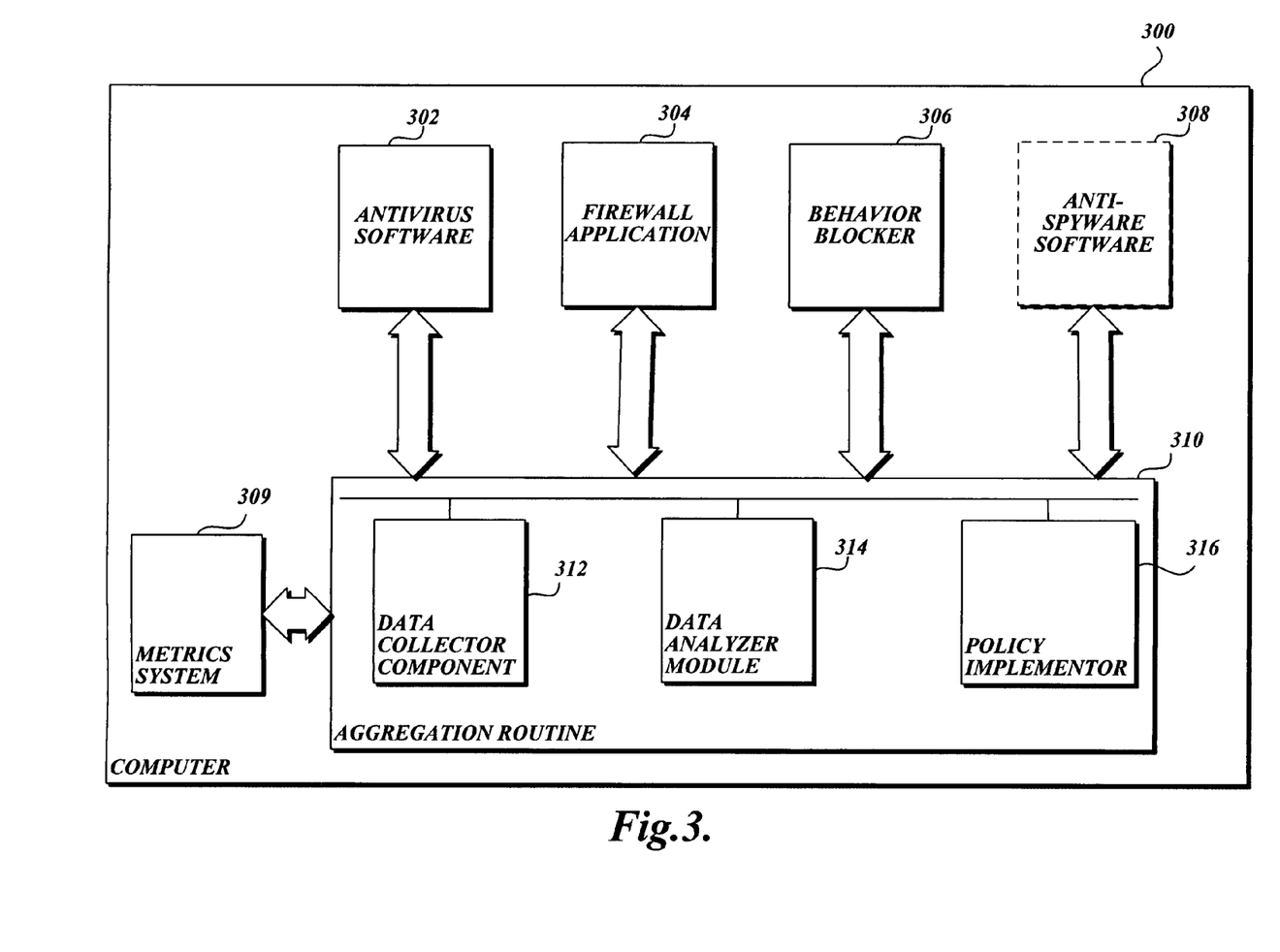
FIG. 3 is a block diagram that illustrates components of a computer capable of aggregating the knowledge base of different anti-malware services and other event collection systems installed on a computer to proactively protect the computer from malware in accordance with the present invention.

As illustrated in FIG. 3, the aggregation routine 310 also includes a data analyzer module 314, which determines whether the suspicious events reported to and/or collected by the data collector component 312 satisfy a predetermined threshold. As described in further detail below with reference to FIG. 4, when the threshold is satisfied, an entity (e.g., a computer, file, process, etc.) will be "marked" as malware by the data analyzer module 314. In some instances, the data analyzer module 314 determines whether the number of suspicious events for a given time frame is substantially more than normal or higher than a specified amount when determining whether the threshold is satisfied. Also, as described in more detail below with reference to FIG. 4, the data analyzer module 314 may analyze metadata generated by the anti-malware services 302, 304, 306, 308 and metric system 309 to determine whether the threshold was satisfied. In this instance, the data analyzer component 314 will typically have an improved context to more accurately determine whether suspicious events observed by the anti-malware services are characteristic of malware.

The aggregation routine 310 also includes a policy implementer 316 that implements a policy designed to protect the computer 300 when an entity associated with the computer 300 is "marked" as malware. As mentioned previously, the data analyzer module 314 determines whether suspicious events reported to the data collector component 312 satisfy a threshold. In instances when the threshold is satisfied, a restrictive policy that protects the computer 300 from malware may be implemented. Generally described, the policy implementer 316 raises the security level of the computer 300 to proactively protect the computer from malware. While a default policy is provided, a user or system administrator may choose the policy that will be implemented. For example, a user may impose a highly restrictive policy that does not allow any network transmissions to be sent or received by the computer 300, except network transmissions that are required to remove malware from the computer 300. However, other protective security measures may be defined in a policy and implemented in the policy implementer 316, including, but not limited to, blocking network traffic on specific communication ports and addresses; blocking communications to and/or from certain network related applications, such as e-mail or Web browser applications; terminating certain applications, and blocking access to particular hardware and software components on the computer 300.

In accordance with one embodiment of the present invention, the policy implementer 316 is configured to communicate with one or more anti-malware services 302, 304, 306, and 308 installed on the computer 300 to restrict the resources available to an entity that was "marked" as malware. For example, the behavior blocking software 306 may be configured to prevent a process that was "marked" as malware from accessing an operating system extensibility point. The policy implementer 316 may be configured to communicate with the behavior blocking software 306 and cause the anti-spyware software 308 to block the process from performing this type of activity.

The present invention may be implemented in a number of different contexts, of which the following are examples. Existing anti-malware services are able to identify events that are positive indicators of malware and suspicious events that may be characteristic of malware. If entities associated with suspicious events were "marked" as malware, then an excessive number of false positives, or instances when an entity was incorrectly identified as malware, would occur. Nonetheless, the knowledge that an entity is associated with events identified as being suspicious by either anti-malware services or event detection systems is helpful when proactively protecting a computer against malware. The present invention may be implemented in this type of existing infrastructure to aggregate the knowledge of different anti-malware services and event detection systems. More specifically, disparate types of anti-malware services (e.g., the antivirus software 302, the firewall application 304, the behavior blocker 306, and the anti-spyware software 308) and event detection systems (e.g., the metrics system 309) may be configured to report suspicious events to a software module that implements aspects of the present invention (e.g., the aggregation routine 310). If the number or type of suspicious events observed by the anti-malware services or event detection systems satisfies the threshold, then the aggregation routine 310 will "mark" an entity associated with the events as being malware.

Those skilled in the art and others will recognize that FIG. 3 is a simplified example of one computer 300 that is capable of performing the functions implemented by the present invention. Actual embodiments of the computer 300 will have additional components not illustrated in FIG. 3 or described in the accompanying text. Also, FIG. 3 shows an exemplary component architecture for proactively protecting a computer 300 from malware—but other component architectures are possible.

Now with reference to FIG. 4, an exemplary embodiment of the aggregation routine 310, illustrated in FIG. 3, which determines whether suspicious event identified by an anti-malware service or other event detection systems is characteristic of malware, will be described.

Figure 4:
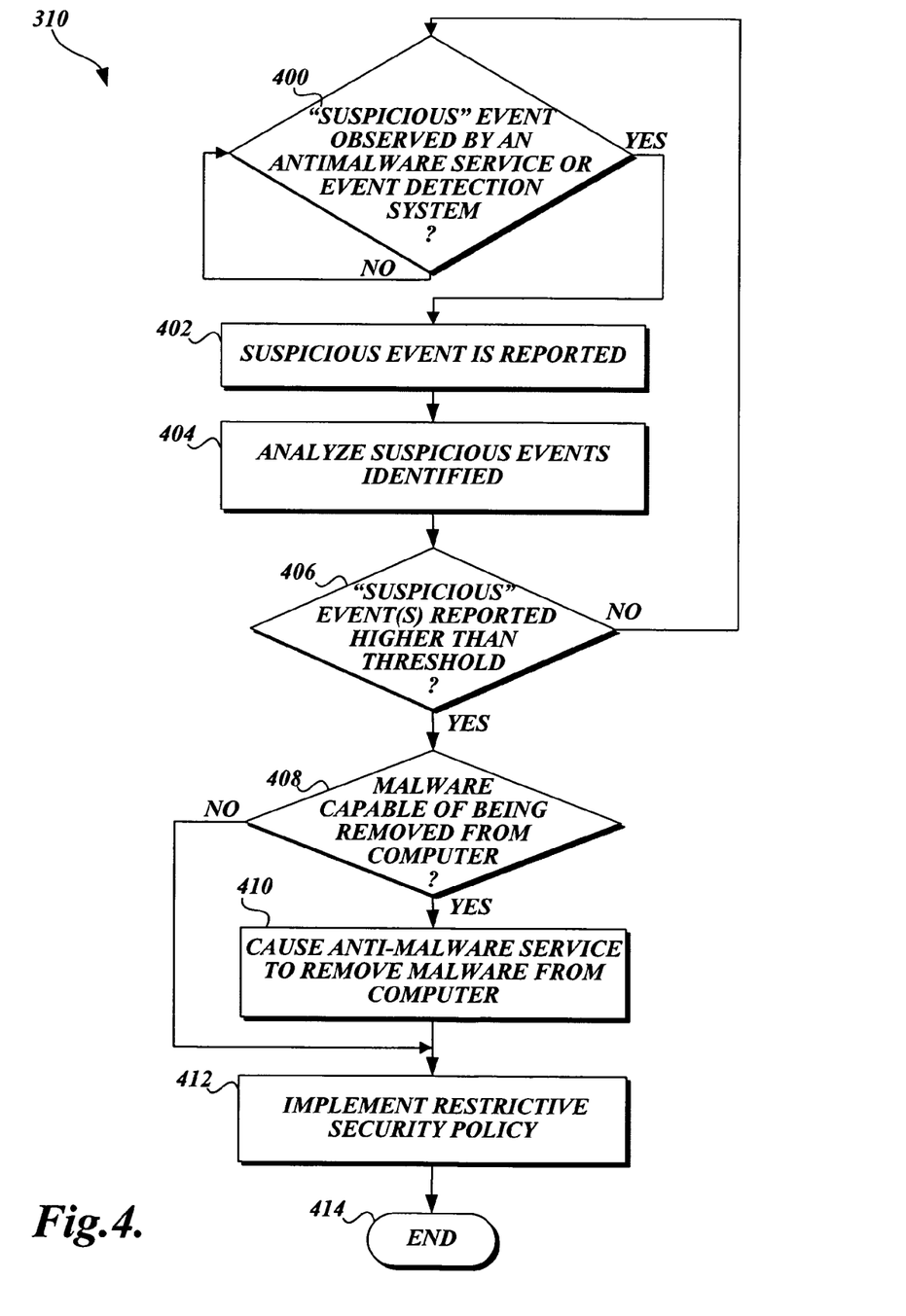
FIG. 4 is a flow diagram illustrating one embodiment of a method implemented in a computer that protects the computer from malware in accordance with the present invention.

As illustrated in FIG. 4, the aggregation routine 310 begins at block 400 where the routine 310 remains idle until a suspicious event is observed by an anti-malware service or other event detection system. In accordance with one embodiment of the present invention that involves anti-malware services, logic in a service defines both positive indicators of a malware infection and suspicious events that may be characteristic of malware. If a positive indicator of a malware infection is identified, then software routines implemented by the aggregation routine 310 will not be executed. However, in instances when a suspicious event is identified, the event is reported and an analysis is performed to determine whether an entity associated with the suspicious event should be "marked" as malware. For example, those skilled in the art and others will recognize that most malware are encrypted to avoid being detected in transit and will be decrypted before execution. Similar to the examples provided above with reference to FIG. 3, when an anti-malware service encounters an encrypted file, for example, this is not in itself a positive indicator that the file contains malware. However, encountering an encrypted file is a "suspicious" event that is reported to aspects of the present invention.

At block 402 the suspicious event identified, at block 400, is reported to the aggregation routine 310. It should be well understood that the present invention may be implemented in a number of different embodiments of which the following are only examples. In one embodiment, the aggregation routine 310 is implemented in an integrated software system created by a single software provider. For example, the antivirus software 302, the firewall application 304, the behavior blocker 306, the anti-spyware software 308, and metrics system 309 illustrated in FIG. 3 may be integrated together with the aggregation routine 310. In this instance, the anti-malware services 302, 304, 306, 308, and event detection system 309 may be configured to directly pass data that describes attributes of a suspicious event, at block 402, using methods that are generally known in the art. In an alternative embodiment of the present invention, the aggregation routine 310 maintains an Application Program Interface ("API") that allows third-party providers to report suspicious events. In this instance, anti-malware services or other event detection system created by third parties may "plug-in" to the aggregation routine 310 and report suspicious events by issuing one or more API calls. In accordance with yet another alternative embodiment, the aggregation routine 310 actively obtains data that describes suspicious events from one or more resources on a computer. For example, as described previously with reference to FIG. 3, an event detection system (e.g., the metrics system 309) may observe and record different events that occur on a computer. Typically, event detection systems will not only provide logic for identifying events that occur on a computer but also maintain databases, event logs, and additional types of resources that are available to other software modules. In this instance, the aggregation routine 310 may obtain data that describes suspicious events from resources maintained by an event detection system.

As further illustrated in FIG. 4, the aggregation routine 310, at block 404, performs an analysis on the data that describes suspicious events received from the anti-malware services or collected from other sources such as event detection systems. The analysis performed is designed to determine whether suspicious events reported to or obtained by the aggregation routine 310 satisfy a predetermined threshold that indicates malware is either attempting to infect the computer or has already infected the computer. For example, a malware author releases a new malware that exploits a previously unknown vulnerability. The malware (1) employs a network port that is infrequently used to access a computer, (2) is contained in an encrypted file when saved on a storage medium, such as a disk, (3) attempts to access an operating system extensibility point, and (4) causes a large quantity of data to be transmitted to other network accessible computers with a corresponding increase in CPU usage. As mentioned previously, in one embodiment of the present invention, the data collected from the anti-malware services or other event detection systems may be merely an indicator that a suspicious event was identified. In this embodiment, an anti-malware service, such as the firewall application 304, may be configured to report that a suspicious event occurred when an infrequently used network port is accessed. Moreover, since the malware causes a large quantity of data to be transmitted to other network accessible computers, the firewall application 304 may determine that an increase in network activity is also a suspicious event. Then, another anti-malware service, such as the anti-spyware software 308, may report the occurrence of a suspicious event when an extensibility point of an operating system is accessed. Merely receiving three reports of suspicious events may not satisfy the predetermined threshold. However, the metric system 309 may then record, in an event log, that CPU usage has increased dramatically. In this instance, the data collector component 312 may be configured to monitor the event log and determine that a suspicious event occurred as a result of the increase in CPU usage. The predetermined threshold applied by the aggregation routine 310 may be satisfied, in this instance, when four (4) suspicious events occur in a specific timeframe. However, those skilled in the art and others will recognize that the example provided above where four (4) suspicious events are enough to satisfy the predetermined threshold is merely an example used for illustrative purposes and should not be construed as limiting on the present invention.

In another embodiment of the present invention, the data collected by the aggregation routine 310 includes metadata that assists in determining whether an entity associated with a computer is malware. Those skilled in the art and others will recognize that some suspicious events are more likely to be associated with malware than other suspicious events. In one embodiment of the present invention, the anti-malware services on a computer are configured to compute a value that represents the probability that one or more suspicious events is associated with malware, which one of skill in the art will recognize as an example of an anti-malware service that generates a weighted value that quantifies the probability that a suspicious event is indicative of malware. In the example provided above, an increase in network activity may be assigned a high value by the firewall application 304, which indicates that a high probability exists that malware is attempting to infect the computer, infect other computers, attack other computers, or leak information. Conversely, saving an encrypted file on a storage medium is less likely to be associated with malware and would therefore be assigned a lower value. In accordance with one embodiment of the present invention, metadata is reported to the aggregation routine 310 that represents the probability that a suspicious event is characteristic of malware. In this instance, the predetermined threshold may be satisfied, for example, when one or more suspicious events are reported with metadata that indicates a high probability that a malware attack is occurring. One of skill in the art will recognize that the foregoing is an example of an aggregation routine 310 that determines whether the summation of the weighted values for the suspicious events is higher than a given value.

It should be well understood that suspicious events reported by anti-malware services may be associated with different entities. For example, a user may download an encrypted file from a network. As mentioned previously, since the file is encrypted, an anti-malware service may report the downloading of the file to the aggregation routine 310 as a suspicious event. Also, the anti-malware service may associate metadata with the file that represents the probability the file is infected with malware. In one embodiment of the present invention, at block 404, the aggregation routine 310 uses the predetermined threshold to determine whether to categorize the file as being infected with malware. However, in other embodiments, the aggregation routine 340 uses the predetermined threshold to determine whether other types of entities are infected with malware. For example, the aggregation routine 310 may "mark" an entire computer, a process, an activity as being associated with malware.

In yet another embodiment of the present invention, metadata reported to the aggregation routine 310 by an anti-malware service may be used by other anti-malware services to characterize an entity. For example, in the example provided above, the firewall application 304 reports to the aggregation routine 310 that an encrypted file was downloaded from the network. In this instance, metadata may be associated with the file that indicates the reason the file was "marked" as suspicious by the firewall application 304 (e.g., the file is encrypted). If the file is later associated with an attempt to access an extensibility point of an operating system, for example, the behavior blocker 306 may issue a query and obtain metadata associated with the file. In this instance, the behavior blocker 306 may use the metadata to more accurately characterize the file. For example, experience in analyzing malware may indicate that the combination of both being encrypted and accessing an operating system extensibility point may, in combination, be a highly suspicious event. As a result, the behavior blocker 306 may then positively identify the file as being infected with malware.

At decision block 406, the aggregation routine 310 determines whether the suspicious event(s) analyzed at block 404 satisfy the predetermined threshold. If the predetermined threshold was satisfied, an entity (e.g., a computer, a file, a process, etc.) is "marked" as being associated with malware. In this instance, the aggregation routine 310 proceeds to block 408 described below. Conversely, if the predetermined threshold was not satisfied, the aggregation routine 310 proceeds back to block 400 and blocks 400 through 406 repeat until the threshold is satisfied.

As illustrated in FIG. 4, at decision block 408, the aggregation routine 310 determines whether any registered anti-malware services are capable of removing the malware from the computer. As mentioned previously, the aggregation routine 310 allows anti-malware services to register and create a profile that identifies the types of malware the service is capable of removing from a computer. If block 410 is reached, a malware may have infected a computer and a registered anti-malware service may be capable of removing the malware from the computer. In this instance, metadata collected by the aggregation routine 310 may be used to identify the malware and an anti-malware service that is capable of removing the malware from the computer. If an appropriate anti-malware service is identified, the aggregation routine 310 causes the anti-malware service to remove the malware, at block 410 using methods generally known in the art. Then the aggregation routine 310 proceeds to block 412. Conversely, if the malware is only attempting to infect the computer or an anti-malware service is not able to remove the malware from the computer, the aggregation routine 310 skips block 410 and proceeds directly to block 412.

At block 412, the aggregation routine 310 implements a restrictive security policy designed to prevent the spread of or infection by the malware. If block 414 is reached, a malware was identified and the computer may or may not still be infected with the malware. In instances when the computer is infected, a general restrictive security policy will typically be implemented that is designed to prevent the spread of the malware. For example, implementing the general security policy will typically include applying multiple restrictions on resources such as, but not limited to, restricting network transmissions from the computer; blocking network traffic on specific communication ports and addresses; blocking communications to and/or from certain network related applications, such as e-mail or Web browser applications; terminating certain applications, and blocking access to particular hardware and software components on a computer. In other instances, the aggregation routine 310 may have removed the malware from a computer so that it is no longer infected. Typically, in this instance, a less restrictive security policy will be implemented and that is designed to prevent the computer from being re-infected with the malware. Then the aggregation routine 310 proceeds to block 414 where it terminates.

It should be well understood that the restrictive security policy implemented at block 414, may be easily disengaged if a determination is made that an entity is not malware. For example, a system administrator or user may determine that a file identified as containing malware is, in fact, benevolent. In this instance, the restrictive security policy may be disengaged by a command generated from the user, system administrator, or automatically as a result of future learning.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method comprising:
    operating at least one processor on the computer to perform a method comprising:
        implementing an event detection system on a computer by at least:
            identifying at least one computer characteristic selected from the group consisting of computer entry points, data streams, computer events, and computer activity occurring on the computer; and
            generating metrics based on the identified at least one computer characteristic;
        implementing anti-malware services on the computer by at least:

observing an event occurring on the computer;
determining whether the observed event is a positive indicator of a malware infection; and
responsive to a determination that the observed event is not a positive indicator of a malware infection:
determining whether the observed event is potentially indicative of malware; and
responsive to a determination that the observed event is potentially indicative of malware, reporting the observed event to an aggregation routine; and
implementing the aggregation routine on the computer by at least:
analyzing the metrics generated by the event detection system to identify a first suspicious event;
receiving a report of a second suspicious event from at least one anti-malware service of the anti-malware services;
identifying a combination of suspicious events, the combination of suspicious events comprising the first suspicious event and the second suspicious event;
determining whether the combination of suspicious events is indicative of malware; and
responsive to a determination that the combination of suspicious events is indicative of malware, marking an entity associated with the suspicious events in the combination of suspicious events as a malware entity, and applying a restrictive security policy that alters operation of the computer.

2. The method as recited in claim 1, wherein receiving a report of a second suspicious event from at least one anti-malware service includes receiving metadata that describes the second suspicious event.

3. The method as recited in claim 2, wherein the metadata that describes the second suspicious event is accessible to the at least one anti-malware service for characterizing an entity associated with the suspicious event.

4. The method as recited in claim 2, wherein the metadata that is received that describes the second suspicious event includes:
a weighted value generated by the at least one anti-malware service that quantifies a probability that the second suspicious event is indicative of malware; and
a reason the second suspicious event was identified as being potentially indicative of malware.

5. The method as recited in claim 1, wherein determining whether the combination of suspicious events is indicative of malware comprises determining if a number of events in the combination of suspicious events occurring in a given time frame is higher than a given value.

6. The method as recited in claim 1, wherein determining if the combination of suspicious events is indicative of malware, includes:
generating a weighted value for each suspicious event in the combination of suspicious events that quantifies a probability that a respective suspicious event is indicative of malware; and
determining whether a summation of weighted values for the suspicious events in the combination of suspicious events is higher than a given value.

7. The method as recited in claim 1, wherein the restrictive security policy prevents the entity associated with the suspicious events in the combination of suspicious events from performing actions and accessing resources on the computer in a way that is contrary to the restrictive security policy.

8. The method as recited in claim 1, wherein applying a restrictive security policy to the computer, includes:
determining whether the entity associated with the suspicious events in the combination of suspicious events is capable of being removed from the computer;
responsive to the entity being capable of removal from the computer, causing an anti-malware service to remove the entity from the computer; and
responsive to the entity not being capable of removal, applying a general restrictive security policy designed to prevent a spread of malware.

9. The method as recited in claim 8, wherein causing the anti-malware service to remove the entity from the computer includes applying a restrictive security policy designed to prevent the malware from subsequently infecting the computer.

10. The method as recited in claim 8, wherein causing the anti-malware service to remove the entity includes allowing the anti-malware services to register and identify types of malware that the anti-malware service is configured to remove from the computer.

11. The method as recited in claim 8, wherein implementing the restrictive security policy includes restricting an ability of the computer to access data on a network.

12. The method as recited in claim 11, wherein restricting the ability of the computer to access data on the network, includes:
blocking network traffic on specific communication ports;
blocking communications from certain network-base applications;
blocking access to hardware and software components on the computer; and
blocking network traffic on specific communication ports and addresses.

13. A computer readable storage memory medium storing computer-executable instructions that, when executed by a computer, cause the computer to implement:
an aggregation routine for determining whether an entity associated with the computer is malware, the aggregation routine including:
a data collector component operative to collect data from a plurality of anti-malware services, the plurality of anti-malware services configured to execute on the computer to detect malware on the computer, each anti-malware service of the plurality of anti-malware services being configured to:
observe events occurring on the computer;
determine whether an observed event is a positive indication of malware or whether the observed event is a suspicious event that potentially indicates malware; take an action against malware when the observed event is determined to comprise a positive indication of malware; and
provide an indication that the observed event is the suspicious event when the observed event is determined to potentially indicate malware and not comprise a positive indication of malware, the data collected identifying the observed event indicated to be potentially indicative of malware;
a data analyzer module configured to analyze the data collected by the data collector component to determine whether a threshold was satisfied by a combination of suspicious events indicated by the collected data, the combination of suspicious events comprising at least one first suspicious event indicated in data collected from at least one first anti-malware service and at least one second suspicious event indicated in data collected from at least one second anti-malware service, the at least one first anti-malware service and the at least one second anti-malware service comprising disparate types of anti-malware services, the data analyzer module further configured to mark an entity associated with one or more suspicious events in the combination of suspicious events as a malware entity; and a policy implementer operative to implement a restrictive security policy responsive to a determination by the data analyzer module that the threshold was satisfied.

14. The computer readable storage memory as recited in claim 13, wherein each anti-malware service in the plurality of anti-malware services is configured to identify and report suspicious events to the data collector component that are potentially indicative of malware.

15. The computer readable storage memory as recited in claim 14, wherein each anti-malware service is further configured to identify the entity that is associated with the suspicious events.

16. The computer readable storage memory as recited in claim 13, further comprising an event collection system for identifying events that occur on the computer and recording the events in a data store that is accessible to the aggregation routine.

17. The computer readable storage memory as recited in claim 13, wherein the aggregation routine, for each anti-malware service in the plurality of anti-malware services, is further configured to:
  allow at least one anti-malware service to register registration data to identify malware that the at least one anti-malware service is capable of removing from the computer; and
  determine from the registration data whether the at least one anti-malware service is capable of removing the malware from the computer in response to a determination by the data analyzer module that the threshold has been satisfied.

18. The computer readable storage memory as recited in claim 13, wherein:
  for each anti-malware service in the plurality of anti-malware services, the data collector component is configured to receive and store metadata that includes, for observed events indicated as being suspicious events by an anti-malware service:
    a weighted value that quantifies a probability that the suspicious event is characteristic of malware; and
    a reason that the observed event was indicated as being suspicious by the anti-malware service; and
  the data collected by the data collector component is analyzed by determining that a summation of weighted values for the at least one first suspicious event and for the at least one second suspicious event is higher than the threshold.

19. A computer readable storage memory storing computer-executable instructions that, when executed on a computer, causes the computer to:
  analyze metrics generated by an event detection system executing on the computer to identify suspicious events that are potentially indicative of malware on the computer, the event detection system generating metrics based on performance characteristics of the computer;
  receive from an anti-malware service executing on the computer a notification of suspicious events that are potentially indicative of malware on the computer identified by the anti-malware service and data that describes the suspicious events identified by the anti-malware service;
  determine whether a combination of suspicious events are indicative of malware, the combination of suspicious events including at least one first suspicious event identified by the anti-malware service and at least one second suspicious event identified based on the metrics generated by the event detection system; and
  responsive to the combination of suspicious events including an indication of a malware, implement a restrictive security policy configured to restrict an entity associated with the combination of suspicious events from performing actions on the computer.

20. The computer readable storage memory as recited in claim 19, wherein the restrictive security policy comprises a policy to prevent the computer from transmitting data to one or more additional computers communicatively connected to the computer.

* * * * *